US012330274B2

(12) United States Patent
Ji et al.

(10) Patent No.: US 12,330,274 B2
(45) Date of Patent: Jun. 17, 2025

(54) IMPACT TOOL

(71) Applicant: Nanjing Chervon Industry Co., Ltd., Nanjing (CN)

(72) Inventors: Guangjie Ji, Nanjing (CN); Hongtao Ke, Nanjing (CN); Shuai Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 63 days.

(21) Appl. No.: 18/451,166

(22) Filed: Aug. 17, 2023

(65) Prior Publication Data

US 2024/0123581 A1 Apr. 18, 2024

(30) Foreign Application Priority Data

Oct. 14, 2022 (CN) ......................... 202211260849.3
Oct. 14, 2022 (CN) ......................... 202211261645.1

(51) Int. Cl.
*B25B 21/02* (2006.01)
*B25F 5/00* (2006.01)

(52) U.S. Cl.
CPC .............. *B25B 21/02* (2013.01); *B25F 5/001* (2013.01)

(58) Field of Classification Search
CPC ....... B25B 21/02; B25B 21/00; B25B 21/026; B25F 5/001
See application file for complete search history.

(56) References Cited

U.S. PATENT DOCUMENTS

2019/0291258 A1* 9/2019 Herr ........................ B25B 21/00
2021/0023629 A1* 1/2021 Kawai .................... B25D 16/00
2023/0121902 A1* 4/2023 Nakashima ............. B25F 5/026 173/162.1

* cited by examiner

*Primary Examiner* — Veronica Martin
(74) *Attorney, Agent, or Firm* — Greenberg Traurig, LLP

(57) ABSTRACT

An impact tool includes a housing; an electric motor including a motor shaft rotating about a first axis; an output shaft used for outputting power and rotating about an output axis; and an impact assembly used for providing an impact force for the output shaft and including a main shaft, where the main shaft is driven by the motor shaft to rotate about an axis of the main shaft. The housing includes a first housing for accommodating at least part of the main shaft, and a support portion that forms sliding friction with the main shaft in the direction of rotation of the main shaft is formed on or connected to an inner wall of the first housing.

12 Claims, 7 Drawing Sheets

IMPACT TOOL

RELATED APPLICATION INFORMATION

This application claims the benefit under 35 U.S.C. § 119(a) of Chinese Patent Application No. CN 202211261645.1 filed on Oct. 14, 2022, and Chinese Patent Application No. CN 202211260849.3, filed on Oct. 14, 2022, which applications are incorporated herein by reference in their entireties.

TECHNICAL FIELD

The present application relates to the technical field of handheld tools and, in particular, to an impact tool.

BACKGROUND

As a handheld power tool for outputting torque, an impact tool is widely favored by users. Different work attachments can be mounted to the impact tool. Through these different work attachments, the impact tool may be, for example, an impact drill, an impact screwdriver, and the like.

The impact tool generally includes a housing and a handle formed on the housing. An electric motor, a transmission assembly, an impact assembly, and an output assembly are disposed in the housing in sequence along the length direction. The transmission assembly can transmit the power of the electric motor to the impact assembly so that the impact assembly provides an impact force for the output assembly, and finally the output assembly outputs the power. In the existing art, the housing and the structures inside the housing are not reasonably designed, the installation of the product is relatively complicated, the axial dimension of the housing is too long, and the impact tool is inconvenient for the users to operate.

This part provides background information related to the present application, which is not necessarily the existing art.

SUMMARY

An impact tool includes a housing; an electric motor including a motor shaft rotating about a first axis; an output shaft used for outputting power and rotating about an output axis; and an impact assembly used for providing an impact force for the output shaft and including a main shaft, where the main shaft is driven by the motor shaft to rotate about an axis of the main shaft. The housing includes a first housing for accommodating at least part of the main shaft, and a support portion that forms sliding friction with the main shaft in the direction of rotation of the main shaft is formed on or connected to an inner wall of the first housing.

In some examples, the support portion includes a sliding bearing connected to the first housing.

In some examples, a limiting portion extending along a radial direction of the first axis is disposed on the sliding bearing and used for limiting the movement of the sliding bearing along an axis direction of the first axis.

In some examples, the limiting portion mates with the first housing to provide an axial limit between the sliding bearing and the first housing along the direction of the first axis.

In some examples, a transmission assembly used for transmitting the rotary motion of the motor shaft to the main shaft and at least partially disposed in the first housing is further included.

In some examples, the transmission assembly includes a sun gear and a planetary gearset, where the sun gear is disposed on the motor shaft, the planetary gearset includes planet gears and an inner ring gear, and the inner ring gear is connected to the first housing.

In some examples, the sliding bearing is integrally formed with the inner ring gear.

In some examples, the sliding bearing is made of powdered metal or steel and impregnated with a lubricant.

In some examples, the sliding bearing gradually releases the lubricant over time during the normal operation of the impact tool.

In some examples, the support portion includes a first support portion protruding from the inner wall of the first housing toward the direction of the main shaft, where an inner wall of the first support portion is configured to form the sliding friction with the main shaft, and the hardness of the first support portion is greater than HRB40.

In some examples, the electric motor includes a stator and a rotor, a stator front-end plate is disposed at the front end of the stator, and the first support portion partially overlaps the stator front-end plate of the electric motor in the direction of the first axis.

In some examples, the front part of the motor shaft is supported by a first bearing, where the first bearing is at least partially disposed in the first support portion.

In some examples, the rear part of the motor shaft is supported by a second bearing, where the second bearing is at least partially disposed in a second housing, and the first housing is connected to the second housing.

In some examples, the first support portion is disposed around the main shaft.

In some examples, the first support portion is made of powdered metal or steel and impregnated with a lubricant, and the first support portion is integrally formed with or fixedly connected to the first housing.

An impact tool includes a housing; an electric motor including a motor shaft rotating about a first axis; an output shaft used for outputting power and rotating about an output axis; and an impact assembly used for providing an impact force for the output shaft and including a main shaft, where the main shaft is driven by the motor shaft to rotate about an axis of the main shaft. A support portion is disposed in the housing, the main shaft is supported by the support portion to rotate, and the support portion forms sliding friction with the main shaft in the direction of rotation of the main shaft.

In some examples, the support portion includes a sliding bearing.

In some examples, a first support portion protruding from an inner wall of the housing toward the direction of the main shaft is included, where an inner wall of the first support portion is configured to form the sliding friction with the main shaft, and the hardness of the first support portion is greater than HRB40.

An impact tool includes a housing; an electric motor including a motor shaft rotating about a first axis; an output shaft used for outputting power and rotating about an output axis; an impact assembly used for providing an impact force for the output shaft and including a main shaft, where the main shaft is driven by the motor shaft to rotate about an axis of the main shaft; and a transmission assembly used for transmitting the rotary motion of the motor shaft to the main shaft and including a planetary gearset, where the planetary gearset includes planet gears and an inner ring gear, the inner ring gear is engaged around the planet gears, and the inner ring gear is formed on or connected to the main shaft and moves synchronously with the main shaft.

In some examples, the planet gears are connected to a relatively stationary component of the housing.

DETAILED DESCRIPTION

Figure 1:
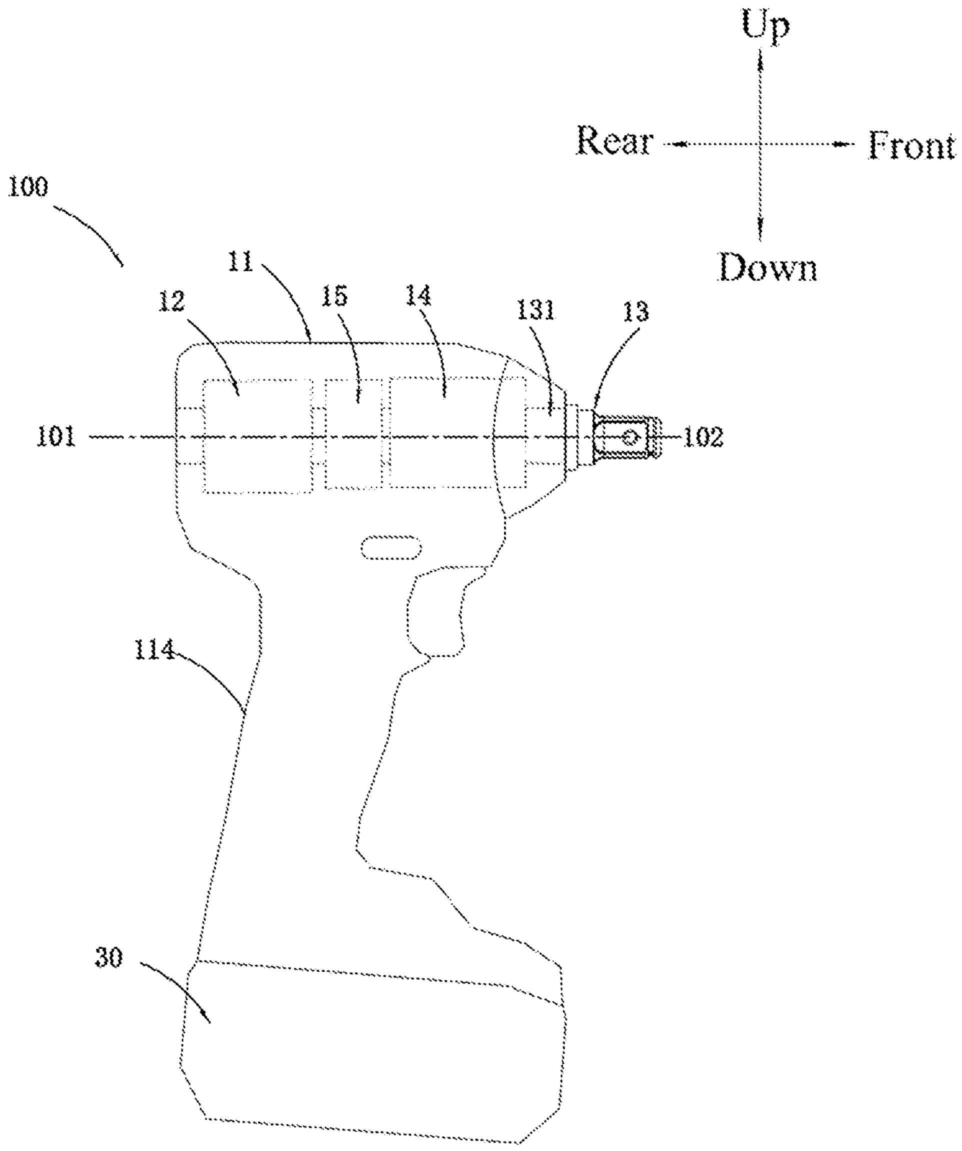
FIG. 1 is a schematic view of the overall structure of an impact tool according to an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear"" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

FIGS. 1 to 5 show an impact tool 100 in the first example of the present application. The impact tool 100 is an impact wrench. It is to be understood that in other alternative examples, different work attachments may be mounted to the impact tool 100. The impact tool 100 with these different work attachments may be, for example, an impact drill or an impact screwdriver.

The impact wrench includes a power supply 30 for supplying electrical energy to the impact wrench. In this example, a direct current power supply supplies power to the impact wrench. In this example, the power supply 30 is a battery pack, and the battery pack mates with a corresponding power supply circuit to supply power to the electrical components in the impact wrench. The battery pack is detachably connected to a grip. It is to be understood by those skilled in the art that the power supply is not limited to the scenario where the battery pack is used, and the power may be supplied to the circuit elements through mains power, an alternating current power supply, or a combination of mains power and the battery pack in conjunction with the corresponding rectifier circuit, filter circuit, and voltage regulator circuit. In this example, the power supply 30 is the battery pack. In the following description, the power supply is replaced with a battery pack 30, which is not intended to limit the present invention.

The impact wrench includes a housing 11, an electric motor 12, a transmission assembly 15, an impact assembly 14, and an output assembly 13. The housing 11 includes a second housing 111 for accommodating at least part of the electric motor 12, a first housing 113 for accommodating at least part of the transmission assembly 15 and the impact assembly 14, and an output housing 112 for accommodating at least part of the output assembly 13. The first housing 113 is located between the second housing 111 and the output housing 112. Further, a grip 114 for a user to operate is formed on or connected to the housing 11. The grip 114 and the first housing 113 or the second housing 111 form a T-shaped or L-shaped structure so that the grip 114 is convenient for the user to hold and operate. The power supply 30 is connected to an end of the grip 114.

The electric motor 12 includes a motor shaft 121 rotatable about a first axis 101. The motor shaft 121 in this example is formed on a rotor of the electric motor 12. In other examples, the motor shaft 121 may be another rotating shaft drivingly connected to the rotor of the electric motor 12. The rotor of the electric motor 12 is coaxially sleeved in the stator, that is to say, the electric motor 12 is a brushless inner rotor motor. The motor shaft 121 passes through the rotor, and each end of the motor shaft 121 protrudes from an end surface of the rotor. A first bearing 161 for supporting is disposed on the part of the front end of the motor shaft 121 protruding from the front end surface of the rotor, a second bearing 162 for supporting is disposed on the part of the rear end of the motor shaft 121 protruding from the rear end surface of the rotor, and the second bearing 162 is positioned by the second housing 111. In this example, the first bearing 161 at least partially overlaps the stator along the direction of the first axis 101. That is to say, a straight line perpendicular to the first axis 101 and passing through both the first bearing 161 and the stator at least exists. The first bearing 161 is at least partially located in a through hole of a stator core. Therefore, the through hole of the stator core is used for accommodating part of the first bearing 161 so that the space occupied by the first bearing 161 in the axial direction can be reduced.

The output assembly 13 includes an output shaft 131 for connecting the work attachment and driving the work attachment to rotate. A clamping assembly or an accommodation portion is disposed at the front end of the output shaft 131 and may clamp corresponding work attachments, such as a screwdriver, a drill bit, and a sleeve, when different functions are implemented.

The output shaft 131 is used for outputting power, and the output shaft 131 rotates about an output axis. In this example, the output axis is a second axis 102. In this example, the first axis 101 coincides with the second axis 102. In other alternative examples, a certain included angle exists between the second axis 102 and the first axis 101. In other alternative examples, the first axis 101 and the second axis 102 are parallel to each other but do not coincide with each other.

The impact assembly 14 is used for providing an impact force for the output shaft 131. The transmission assembly 15 is disposed between the electric motor 12 and the impact assembly 14 and used for transmitting power between the electric motor 12 and the impact assembly 14. In this example, the transmission assembly 15 is a deceleration gear system. The transmission assembly 15 includes a sun gear 151 and a planetary gearset. The sun gear 151 is disposed on the motor shaft 121. The planetary gearset includes planet gears 152, an inner ring gear 153, and a planet carrier. Several planet gears 152 are all engaged with the sun gear 151. The inner ring gear 153 is engaged around the several planet gears 152. A planetary axle 1541 in the form of a cantilever beam is disposed on the planet carrier, and the planet gears 152 are connected to the planetary axle 1541. The last stage of planet gear 152 is connected to the impact assembly 14 through the planet carrier. The inner ring gear 153 is connected to the first housing 113. The sun gear 151 is the input end of the transmission assembly 15, the sun gear 151 can receive the power of the motor shaft 121, and the planet gears 152 are the output end of the transmission assembly 15. The motor shaft 121 of the electric motor 12 rotates, the motor shaft 121 drives the sun gear 151 to rotate around the planetary axle 1541, and at the same time, the planet gears 152 crawl along the ring-shaped internal teeth of the inner ring gear 153 and revolve around the first axis 101 of the motor shaft 121. The revolution of the planet gears 152 drives the planet carrier to rotate and the rotation is transmitted to the impact assembly 14 drivingly connected to or integrally formed with the planet carrier.

The impact assembly 14 includes a main shaft 141, an impact hammer 142 sleeved on the outer circumference of the main shaft 141, a hammer anvil 144 disposed at the front end of the impact hammer 142, and an elastic element 143. The planet carrier of the last stage of planet gear 152 is drivingly connected to or integrally formed with the main shaft 141. The hammer anvil 144 includes an anvil 1441 and the output shaft 131. The impact hammer 142 is driven by the main shaft 141, the anvil 1441 mates with the impact hammer 142 and is struck by the impact hammer 142, and the anvil 1441 drives the output shaft 131 to rotate. The impact hammer 142 includes an impact hammer body and a pair of first end teeth symmetrically disposed on the front end surface of the impact hammer body in the radial direction and protruding from the front end surface of the impact hammer body. A pair of second end teeth are symmetrically disposed on the rear end surface of the anvil 1441 opposite to the impact hammer 142 in the radial direction and protrude from the rear end surface of the anvil 1441 opposite to the impact hammer 142. The output shaft 131 protrudes from the output housing 112, and the output shaft 131 is connected to the anvil 1441. It is to be understood that the anvil 1441 and the output shaft 131 may be integrally formed or separately formed as separate parts. The impact hammer 142 is supported on the main shaft 141. While the impact hammer 142 rotates integrally with the main shaft 141, the impact hammer 142 reciprocates and slides relatively to the main shaft 141 in the front and rear direction.

The elastic element 143 is located between the impact hammer 142 and the transmission assembly 15, and the elastic element 143 provides a force for the impact hammer 142 to approach the hammer anvil 144.

During the working process of the impact wrench, the impact hammer 142 reciprocates back and forth relative to the main shaft 141 along the axis direction of the main shaft 141 with a predetermined stroke. In this example, the axis of the main shaft 141 coincides with the first axis 101. The impact hammer 142 includes a first position at which the impact hammer 142 moves forward farthest and a second position at which the impact hammer 142 moves backward farthest. At the first position, the first end teeth of the impact hammer 142 are engaged with the hammer anvil 144, that is to say, the front end of the stroke of the impact hammer 142 is stopped by the hammer anvil 144.

As shown in FIGS. 2 to 5, the main shaft 141 includes a main portion 1411, a rotating support portion 1413, and a connecting portion 1412 located between the main portion 1411 and the rotating support portion 1413, the main portion 1411 mates with the impact hammer 142, and the connecting portion 1412 is connected to the several planet gears 152. The main shaft 141 is supported by a support portion 113*a* to rotate. The support portion 113*a* supporting the main shaft 141 to rotate is formed on or connected to the inner wall of the first housing 113. The support portion 113*a* forms sliding friction with the main shaft along the direction of rotation of the main shaft.

In this example, the support portion 113*a* includes a first support portion 1131 formed on the first housing. The rotating support portion 1413 of the main shaft 141 and the first support portion 1131 of the first housing 113 form sliding friction along the direction of rotation of the main shaft 141, so as to support the main shaft 141 to rotate. The hardness of the first support portion 1131 is greater than HRB40. In some examples, the hardness of the first support portion 1131 is HRB50 to HRB100. In some examples, the hardness of the first support portion 1131 is greater than or equal to HRC20. In some examples, the hardness of the first support portion 1131 is HRC25 to HRC70. The hardness of the first support portion 1131 is not limited thereto and may be specifically set according to the requirements of the load and the impact force output range of a specific product.

In this example, the first support portion 1131 is made of powdered metal or steel, thereby ensuring the hardness of the structure. The first housing 113 is also made of powdered metal or steel, thereby reducing the machining difficulty. In other alternative examples, the first support portion 1131 is made of powdered metal or steel, the first housing 113 is made of other materials, and the first support portion 1131 is embedded, welded, and thermally processed so that the first support portion 1131 is non-detachably or non-removably formed on the first housing 113.

Figure 2:
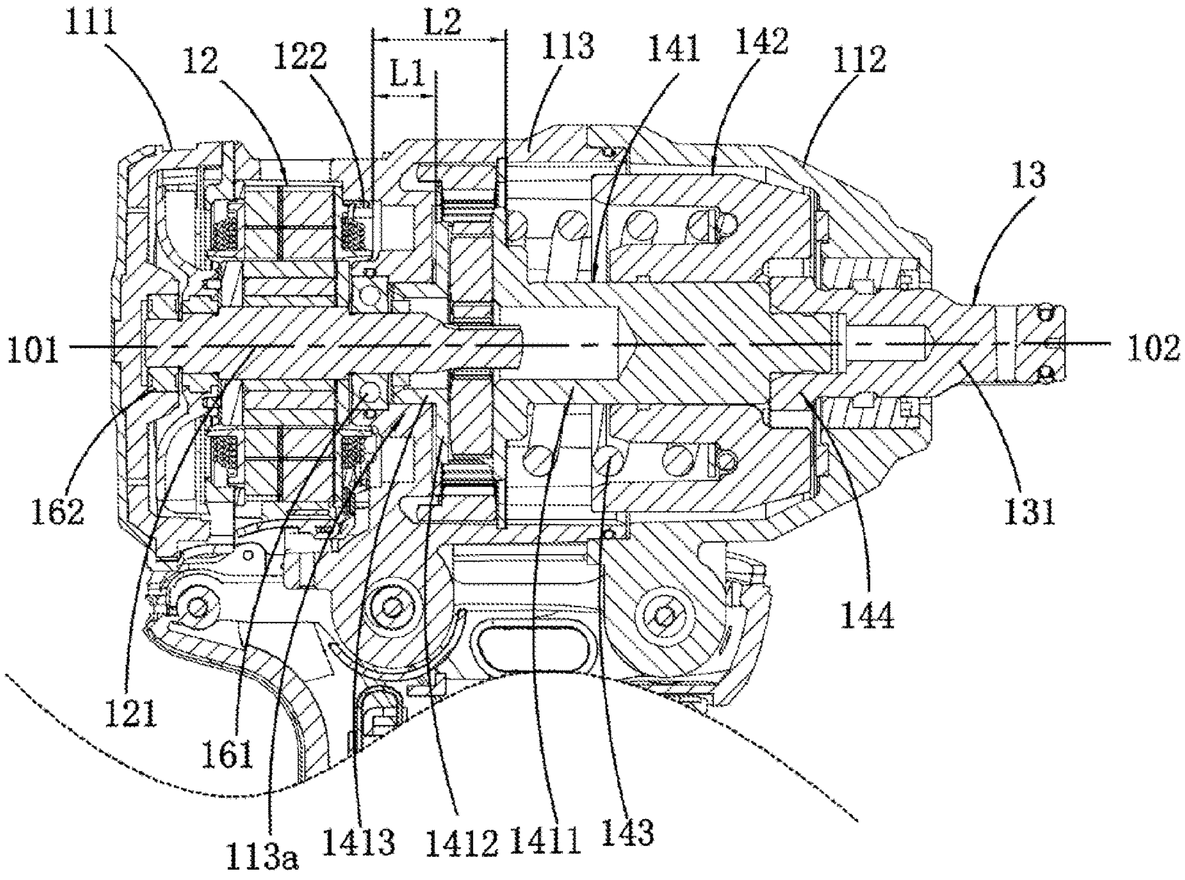
FIG. 2 is a sectional view of part of the structure of an impact tool according to an example of the present application.
Figure 3:
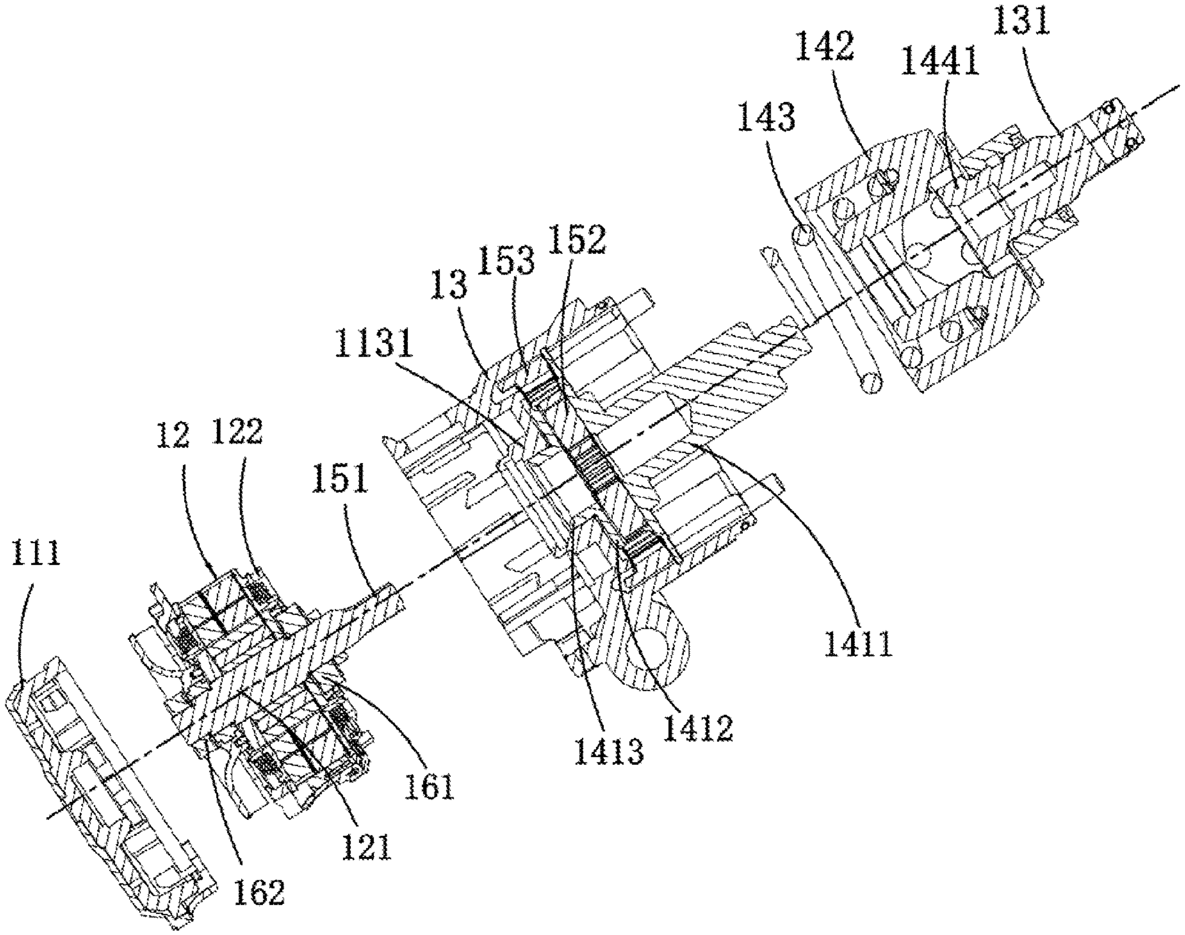
FIG. 3 is an exploded view of FIG. 2.
Figure 4:
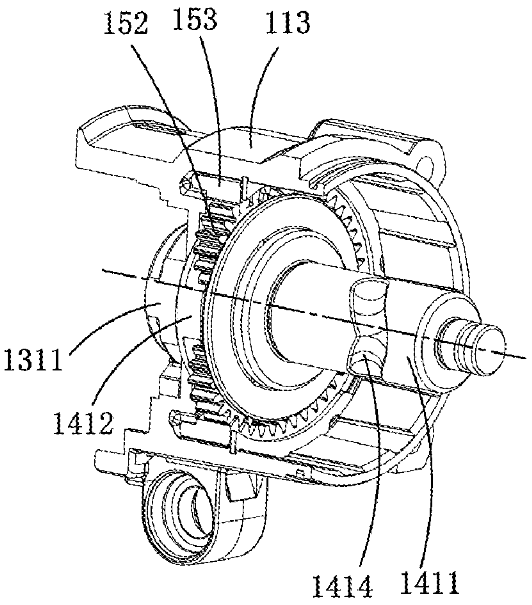
FIG. 4 is structural view one of a transmission assembly and a main shaft involved in an example of the present application.

In the present application, since the rotating main shaft 141 bears part of the impact force of the impact hammer 142 impacting the hammer anvil 144 during the impact process of the impact tool 100, the oscillating tendency of the main shaft 141 needs to be suppressed during the rotation of the main shaft 141. The strength requirements of the support structure of the main shaft 141 are not only anti-friction requirements. In the related art, the bearing of the main shaft 141 is often a needle roller bearing or a ball bearing for supporting the main shaft 141. In this example, the hardness of the first support portion 1131 is increased so that the first support portion 1131 can replace the bearing of the main shaft in the related art and support the main shaft 141 to rotate, thereby canceling the bearing of the main shaft. On the one hand, the structure is simpler, the assembly is easier, and the assembly tolerance is reduced. On the other hand, when the bearing of the main shaft in the related art is mounted, mounting structures such as a mounting groove are required; after the needle roller bearing or the ball bearing is canceled, no mounting structure such as the mounting groove for mounting the bearing of the main shaft is required on the first support portion 1131, thereby reducing the length of the impact assembly and reducing the distance between the front end surface of a stator front-end plate 122 and the main shaft 141. As shown in FIG. 2, the distance L1 between the stator front-end plate 122 of the electric motor 12 and the rear end surface of the connecting portion 1412 may be reduced to less than or equal to 10 mm. The distance L2 between the stator front-end plate 122 of the electric motor 12 and the end surface of the main portion 1411 may be reduced to less than or equal to 25 mm. In this example, L2 is less than or equal to 22 mm. Further, the overall axial dimension of the impact tool 100 is reduced so that the impact tool 100 is more convenient for the user to operate.

Figure 5:
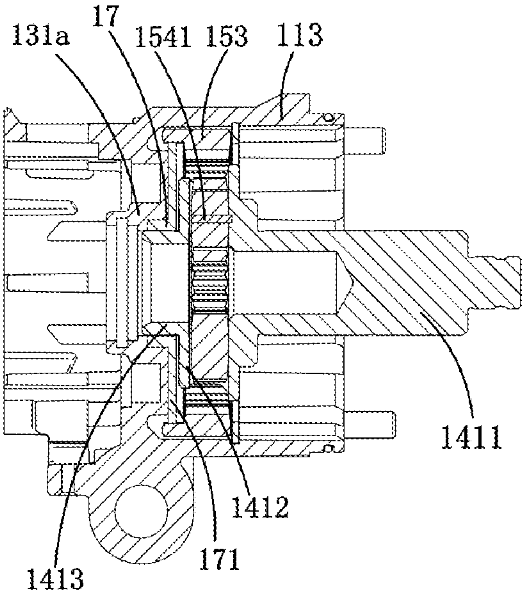
FIG. 5 is structural view two of a transmission assembly and a main shaft involved in an example of the present application.

As shown in FIG. 5, as another example of this example, the support portion 113*a* on the first housing 113 includes a sliding bearing 17. The sliding bearing 17 is disposed on the inner side of the first housing 113. The sliding bearing 17 is used for supporting the main shaft 141 to rotate. In this example, the sliding bearing 17 is an oil-impregnated bearing. In other alternative examples, the sliding bearing 17 is a bushing structure made of powdered metal or steel and impregnated with a lubricant. A limiting portion 171 extending along the radial direction of the first axis 101 is disposed on the sliding bearing 17, and the limiting portion 171 provides an axial limit between the sliding bearing 17 and the first housing 113 along the direction of the first axis 101. It is to be understood that the limiting portion 171 is used so that the axial limit of the sliding bearing 17 is within the length of the sliding bearing 17.

The sliding bearing 17 is used for replacing the rolling bearing in the related art. The axial limit of the rolling bearing needs to be disposed on the outer side of the rolling bearing in the axial direction. The installation of the sliding bearing 17 is simple. On the one hand, the axial dimension of the sliding bearing 17 is smaller; on the other hand, different from the rolling bearing, the axial limit does not need to be disposed on the outer side in the axial direction so that the length of the support structure of the main shaft 141 can be reduced, thereby reducing the distance between the front end surface of the stator front-end plate 122 and the main shaft 141. In this example, the distance L1 between the stator front-end plate 122 of the electric motor 12 and the rear end surface of the connecting portion 1412 may be reduced to less than or equal to 10 mm. The distance L2 between the stator front-end plate 122 of the electric motor 12 and the end surface of the main portion 1411 may be reduced to less than or equal to 25 mm. In this example, L2 is less than or equal to 22 mm. Further, the overall axial dimension of the impact tool 100 is reduced so that the impact tool 100 is more convenient for the user to operate.

In this example, the structure of the first support portion 1131 is still retained on the first housing 113, but the hardness of the first support portion 1131 only needs to satisfy the standard of the housing. For example, the hardness of the first support portion 1131 is less than HRB40.

During installation, the sliding bearing 17 may be connected to the inside of the support portion 113*a* as a separate component, that is, the sliding bearing 17 may be embedded in the support portion 113*a*. In this example, to reduce the assembly steps and improve the component assembly reliability, the sliding bearing 17 is integrally formed with the inner ring gear 153. As shown in FIG. 5, the sliding bearing 17 is a bushing structure. The inner ring gear 153 is formed by pressing powdered metal. In this example, a bushing is formed at an end of the inner ring gear 153 facing the electric motor 12. The integrated structure of the sliding bearing 17 and the inner ring gear 153 is formed by powdered metal pressing and the sintering process or any other suitable process. The inside of the bushing structure is impregnated with a lubricant, such as oil. In this manner, the bushing structure has the self-lubricating property. The sliding bearing gradually releases the lubricant over time during the normal operation of the impact tool.

In this example, as shown in FIG. 2, the support portion 113*a* partially overlaps the stator front-end plate 122 of the electric motor 12 in the direction of the first axis 101. The first bearing 161 supporting the front part of the motor shaft 121 is disposed in the first support portion 1131. Through the preceding arrangement, the axial dimension of the impact tool 100 can be further reduced.

Figure 6:
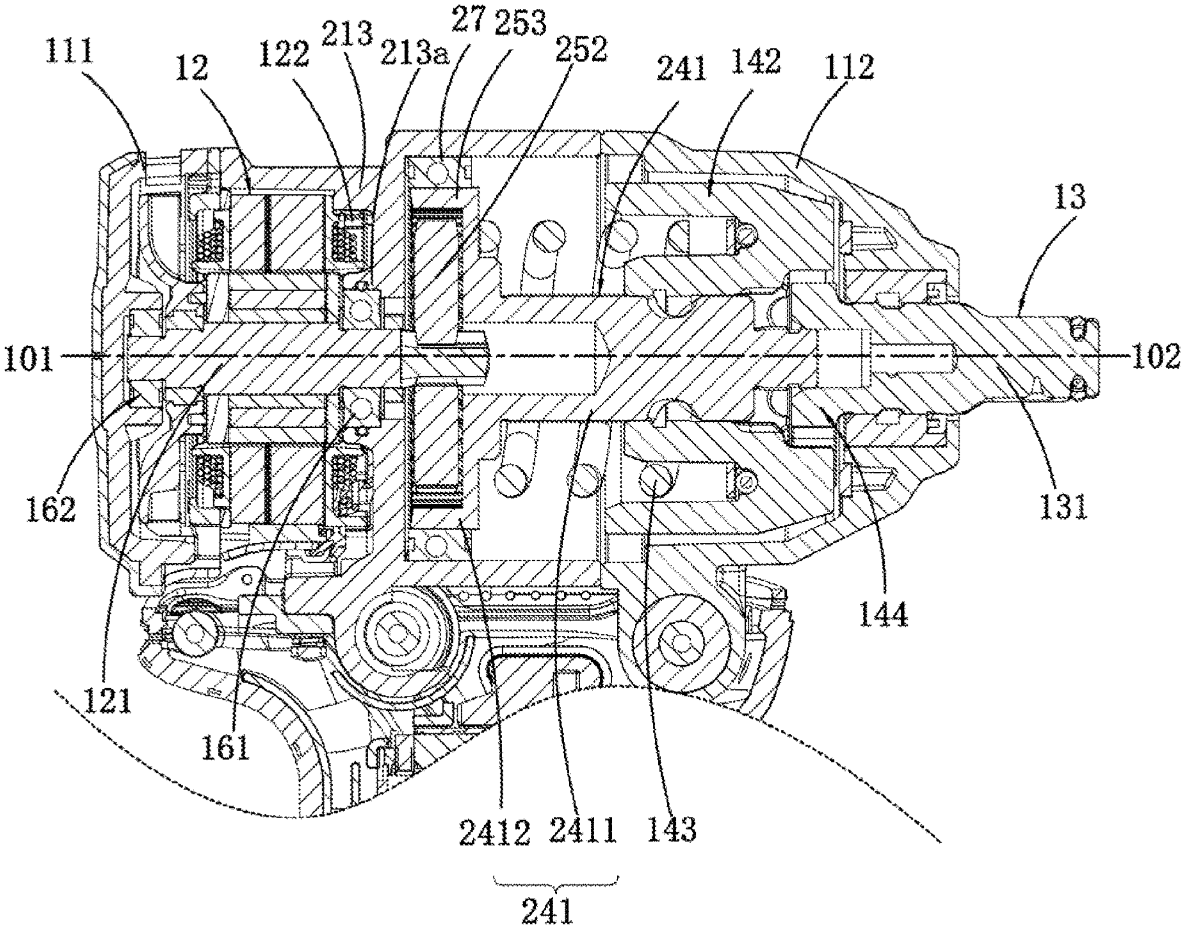
FIG. 6 is a sectional view of part of the structure of an impact tool according to another example of the present application.
Figure 7:
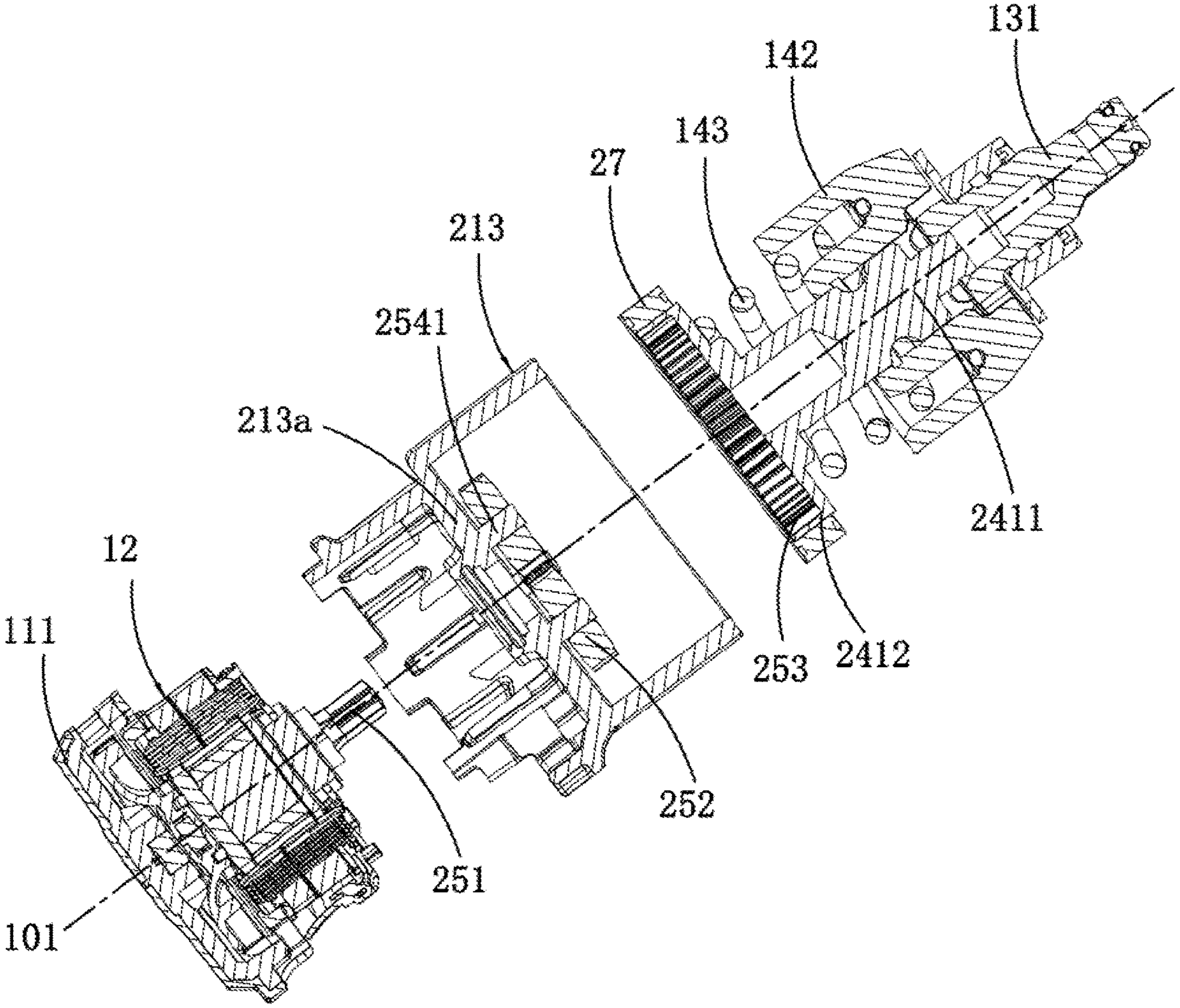
FIG. 7 is an exploded view of FIG. 6.

FIGS. 6 and 7 show the second example of the present application. Parts of the first example that are compatible with this example can be applied to this example, and only differences between this example and the first example are described below.

In this example, the transmission assembly includes a sun gear 251 and a planetary gearset. The sun gear 251 is formed on or connected to the motor shaft 121. In this example, the sun gear 251 is formed in front of the motor shaft 121. In other alternative examples, the sun gear 251 is a separate component connected in front of the motor shaft 121. The planetary gearset includes planet gears 252 and an inner ring gear 253, several planet gears 252 are all engaged with the sun gear 251, and the inner ring gear 253 is engaged around the several planet gears 252.

In this example, the inner ring gear 253 is formed on or connected to a main shaft 241, and the planet gears 252 are connected to a relatively stationary component of the housing 11. The inner ring gear 253 is integrally formed with the main shaft 241, and the planet gears 252 are fixedly connected to the housing 11. When the electric motor 12 rotates, the single planet gear 252 only rotates, and the inner ring gear 253 engaged with the planet gears 252 drives the main shaft 241 to rotate, which is quite different from the manner in the related art in which the inner ring gear 253 is fixed, the planet gears 252 rotate and revolve, the planet gears 252 revolve to drive the main shaft 241 to rotate.

In this example, a support portion 213*a* is formed on a first housing 213. The planet gears 252 are sleeved on a planetary axle 2541, and the planetary axle 2541 is fixedly connected to the support portion 213*a*. In this example, the planetary axle 2541 is fixedly connected to the support portion 213*a* in the fixing manner of a cantilever beam. In other alternative examples, the planet gears 252 may be connected to another component that is stationary relative to the housing 11 but movable relative to the main shaft 241. The connection structure of the planet gears 252 is not limited to the manner of the planetary axle 2541 and the cantilever beam. As long as it can be satisfied that when the electric motor 12 rotates, the single planet gear 252 only rotates, and the inner ring gear 253 engaged with the planet gears 252 drives the main shaft 241 to rotate, it belongs to the scope of the present application. Based on this principle, the change and improvement of the connection manner and connection position of the planet gears 252 do not limit the substantive content of the present invention.

In this example, the main shaft 241 is supported by a main shaft bearing 27. Since the inner ring gear 253 is no longer fixed to the housing 11 and is connected to or formed on the main shaft 241, the main shaft bearing 27 is disposed around the inner ring gear 253, and an assembly section for assembling with the main shaft bearing 27 does not need to be provided at the rear end of the main shaft 241. In this example, the main shaft 241 includes a main portion 2411 and a connecting portion 2412. The impact hammer 142 mates with the main portion 2411. The inner ring gear 253 is formed on or connected to the inner circumference of the connecting portion 2412, and the main shaft bearing 27 is disposed on the outer circumference of the connecting portion 2412. It can be seen that the main shaft bearing 27 is disposed around the inner ring gear 253, and the assembly section connected to the rear end of the connecting portion 2412 on the main shaft 241 is canceled, thereby reducing the length of the main shaft 241. Further, the overall axial dimension of the impact tool is reduced so that the impact tool is more convenient for the user to operate. The rear end surface of the main shaft bearing 27 does not overlap the front end surface of the first bearing 161 in the axial direction, thereby reducing the structural assembly complexity.

In this example, the inner ring gear 253 is fixedly connected to the connecting portion 2412 of the main shaft 241. The main shaft bearing 27 is a rolling bearing. The inner side of the main shaft bearing 27 abuts against the outer side of the inner ring gear 253. The outer side of the main shaft bearing 27 abuts against the inner side of the first housing 213, and the main shaft bearing 27 remains stationary relative to the first housing 213. When the motor shaft 121 drives the sun gear 251 to rotate, the sun gear 251 drives the planet gears 252 to rotate around the planetary axle 2541. The planet gears 252 drive the inner ring gear 253 to rotate about the first axis. Since the inner ring gear 253 is connected to the main shaft 241, the main shaft 241 rotates synchronously with the inner ring gear 253. Further, the power outputted from the motor shaft 121 is transmitted to the main shaft 241.

It is to be understood that, in this example, the set of planet gears 252 is a layer of planet gears 252. In other alternative examples, multiple stages of planet gears 252 may be included.

It is to be understood that, in this example, the second housing 111 and the first housing 213 may be separate structures connected to each other, or the second housing 111 and the first housing 213 may be integrally formed into an integral component. The connection structure and specific structure of the second housing 111 and the first housing 213 do not limit the essence of this example and are specifically designed according to a specific product.

It is to be understood that the transmission assembly in this example can also be applied to other rotary power tools that are not the impact tools but use the planetary gearset for power transmission. The inner ring gear 253 is configured to drive the output shaft 131 to rotate, the planet gears 252 are mounted on a relatively stationary component of the housing 11, and the planet gears 252 are driven by the sun gear 251 to rotate.

The support portion 213*a* partially overlaps the stator front-end plate 122 of the electric motor 12 in the direction of the first axis 101. The first bearing 161 supporting the front part of the motor shaft 121 is disposed in the support portion 213*a*. Through the preceding arrangement, the axial dimension of the impact tool can be further reduced.

Figure 8:
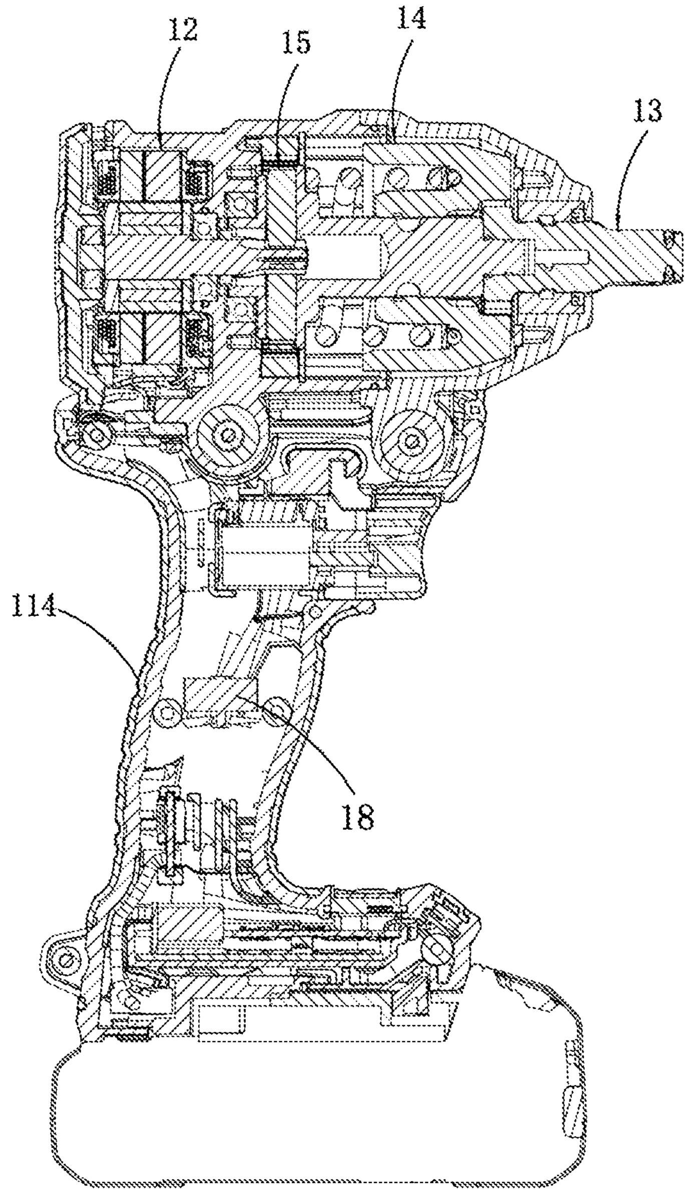
FIG. 8 is a sectional view of the overall structure of an impact tool according to an example of the present application.

In addition, in the related art, as shown in FIG. 8, two heat dissipation methods for the impact tool generally exist. In one heat dissipation method, a fan is mounted on the part of the front end of the motor shaft 121 protruding from the front end surface of the rotor. In the other heat dissipation method, the fan is mounted on the part of the rear end of the motor shaft 121 protruding from the rear end surface of the rotor. In the preceding two methods, the disadvantage that the overall dimension of the body is too large exists; moreover, the impact tool works intermittently, and the fan cannot continuously dissipate heat.

In this example, the fan on the motor shaft 121 is canceled, and if necessary, a fan 18 may be added inside the grip so that the axial dimension of the impact tool can be further reduced.

Some of the technical solutions in the preceding examples may be used alone, or a combination of several technical solutions may be used, so as to reduce the axial length of the impact tool according to the actual requirements of the impact tool.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:

a housing;

an electric motor comprising a stator, a rotor, and a motor shaft rotating about a first axis;

an output shaft used for outputting power and rotating about an output axis; and an impact assembly used for providing an impact force for the output shaft and comprising a main shaft, wherein the main shaft is driven by the motor shaft to rotate about an axis of the main shaft, the housing comprises a first housing for accommodating at least part of the main shaft, and the first housing has a support portion, a sliding bearing is connected to the support portion, and the sliding bearing forms sliding friction with the main shaft in a direction of rotation of the main shaft, a first bearing supports a front part of the motor shaft and is at least partially disposed in the support portion, and a stator front-end plate is disposed at a front end of the stator of the electric motor, the main shaft includes a main portion, a rotating support portion and a connecting portion located between the main portion and the rotating support portion, a distance between the stator front-end plate and a rear end surface of the connecting portion is less than or equal to 10 mm.

2. The impact tool of claim 1, wherein a limiting portion extending along a radial direction of the first axis is disposed on the sliding bearing, and the limiting portion is used for limiting movement of the sliding bearing along an axis direction of the first axis.

3. The impact tool of claim 2, wherein the limiting portion mates with the first housing to provide an axial limit between the sliding bearing and the first housing along a direction of the first axis.

4. The impact tool of claim 1, further comprising a transmission assembly used for transmitting rotary motion of the motor shaft to the main shaft, and the transmission assembly is at least partially disposed in the first housing.

5. The impact tool of claim 4, wherein the transmission assembly comprises a sun gear and a planetary gearset, wherein the sun gear is disposed on the motor shaft, the planetary gearset comprises planet gears and an inner ring gear, and the inner ring gear is connected to the first housing.

6. The impact tool of claim 5, wherein the sliding bearing is integrally formed with the inner ring gear.

7. The impact tool of claim 1, wherein the sliding bearing is made of powdered metal or steel and impregnated with a lubricant.

8. The impact tool of claim 7, wherein the sliding bearing gradually releases the lubricant over time during a normal operation of the impact tool.

9. An impact tool, comprising:

a housing;

an electric motor comprising a motor shaft rotating about a first axis;

an output shaft used for outputting power and rotating about an output axis; and an impact assembly used for providing an impact force for the output shaft and comprising a main shaft, wherein the main shaft is driven by the motor shaft to rotate about an axis of the main shaft, the housing comprises a first housing for accommodating at least part of the main shaft, the first housing has a first support portion, the main shaft is supported by the first support portion to rotate, and the first support portion forms sliding friction with the main shaft in a direction of rotation of the main shaft.

10. The impact tool of claim 9, wherein the first support portion protrudes from an inner wall of the housing toward a direction of the main shaft, wherein an inner wall of the first support portion is configured to form the sliding friction with the main shaft, and hardness of the first support portion is greater than HRB40.

11. An impact tool, comprising:

a housing;

an electric motor comprising a motor shaft rotating about a first axis;

an output shaft used for outputting power and rotating about an output axis;

an impact assembly used for providing an impact force for the output shaft and comprising a main shaft, wherein the main shaft is driven by the motor shaft to rotate about an axis of the main shaft; and a transmission assembly used for transmitting rotary motion of the motor shaft to the main shaft and comprising a planetary gearset, wherein the planetary gearset comprises planet gears and an inner ring gear, the inner ring gear is engaged around the planet gears, and the inner ring gear is formed on or connected to the main shaft and moves synchronously with the main shaft.

12. The impact tool of claim 11, wherein the planet gears are connected to a relatively stationary component of the housing.

* * * * *